Dec. 27, 1927.
Re. 16,834
L. M. KNOLL
RADIO SYSTEM
Original Filed April 2, 1920
Fig. 1.
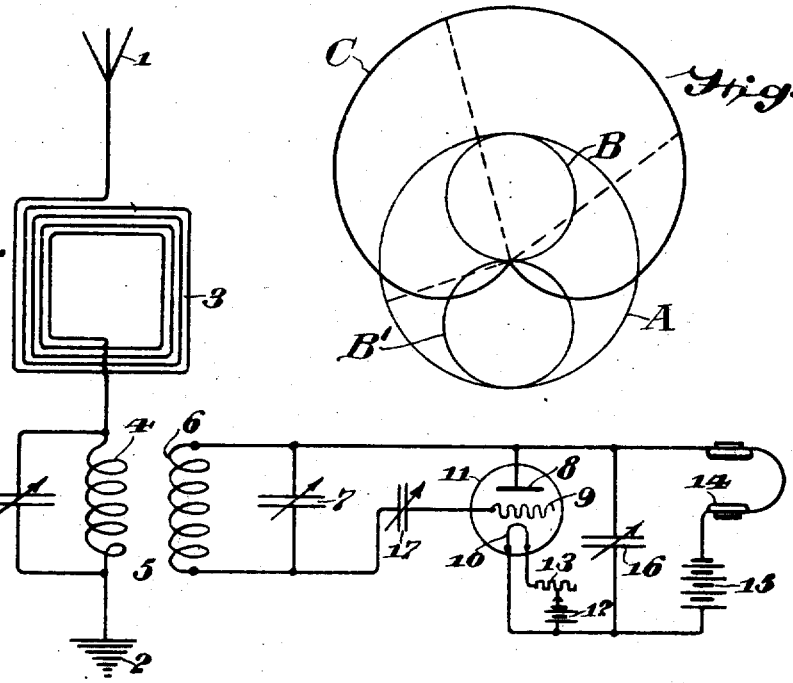
Fig. 2.
Fig. 3.
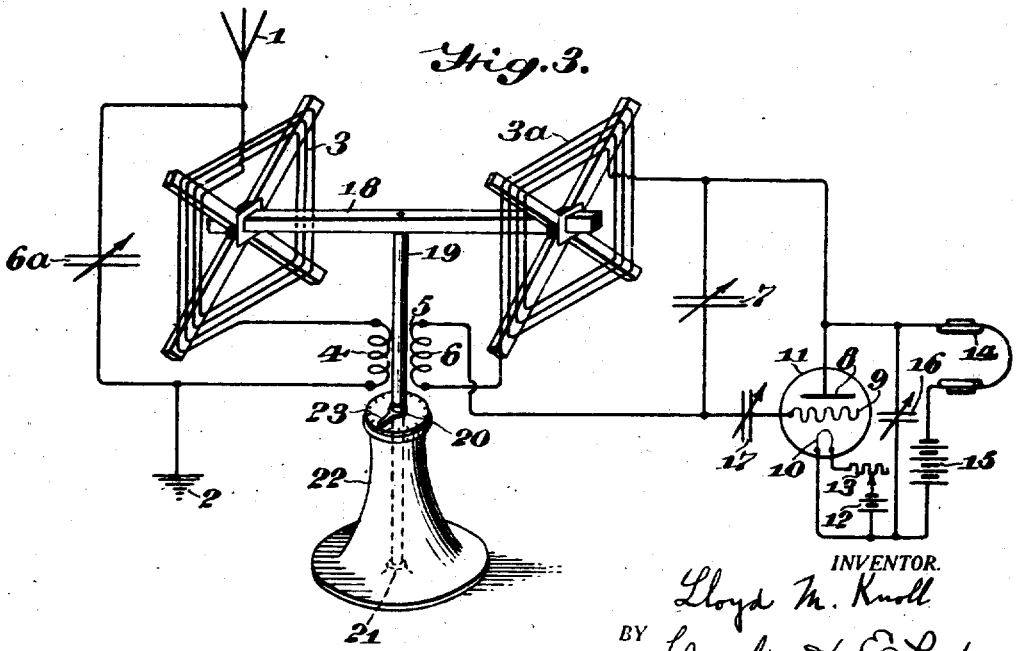
INVENTOR.
Lloyd M. Knoll
BY Cornelius L. Ethet
his ATTORNEY.

Reissued Dec. 27, 1927. Re. 16,834

UNITED STATES PATENT OFFICE.

LLOYD M. KNOLL, OF PHILADELPHIA, PENNSYLVANIA, ASSIGNOR, BY DIRECT AND MESNE ASSIGNMENTS, TO FEDERAL TELEGRAPH COMPANY, OF SAN FRANCISCO, CALIFORNIA, A CORPORATION OF CALIFORNIA.

RADIO SYSTEM.

Original No. 1,394,026, dated October 18, 1921, Serial No. 370,683, filed April 2, 1920. Application for reissue filed February 3, 1923. Serial No. 616,802.

My invention relates to radio signaling or control systems involving the transmission through the natural media of electro-radiant energy or electromagnetic waves for telegraphy, telephony or other signaling or control purposes.

My invention resides in apparatus for the reception of electro-radiant energy from selected sources with a minimum of interference from other sources.

My invention further resides in apparatus for directional determination of electro-radiant energy sources.

My invention still further resides in combined uniform directional and non-uniform directional radio absorption structure and apparatus wherein the characteristics of both may be combined in a highly efficient and effective manner with a minimum of apparatus and adjustments.

My invention also resides in apparatus hereinafter described and claimed.

Heretofore whenever it was necessary or desirable to receive radio signals from certain specific transmitting stations, or for the purpose of ascertaining their direction, it has been customary to employ absorptions structure of the so called "loop" or "exploring coil" type. The directional characteristics of these loops or coils are such that it is impossible to differentiate between the true and converse directions, both being indicated with equal facility, leaving much doubt as to which of them indicates the direction desired.

The structure of my invention eliminates all such doubt as it indicates only the actual direction of the transmitting station and reduces or annuls the effect of transmitters located in the opposite or other directions.

For an illustration of some of the forms my structure may take, reference is to be had to the accompanying drawing in which:

Fig. 1 diagrammatically shows a radio receiving system embodying my structure.

Fig. 2 graphically indicates the directional characteristic of the structure herein described.

Fig. 3 is a modification of Fig. 1 in which a multiple of non-uniform directional structure are employed.

In Fig. 1 an ordinary radio antenna 1, of substantially uniform directional characteristic is connected to a counter-capacity or earth 2 through loop 3 and the primary coil 4 of radio frequency transformer 5. Shunted around the primary coil is a variable tuning condenser 6[a] which may also be connected so as to shunt both the primary coil and the loop as shown in Fig. 3. The arrangement thus far described constitutes the absorption, primary, or antenna circuit.

Loop 3 consists of a rectangular, flat helical, round, or other suitably shaped coil, wound on a frame or any other suitable means of support rotatively mounted on its vertical axis and of such dimensions and convolutions of conductor that it will absorb energy from passing electromagnetic waves with fair proportion to that of antenna 1.

As well known in the art an ordinary antenna, especially if of the vertical type, itself absorbs energy equally well from all directions and therefore has a substantially uniform directional characteristic, which, in refined cases, may be graphically represented by a circle, as at A, Fig. 2.

Loop 3, of the type described, when used alone absorbs most energy when the plane of its winding is in the line of wave propagation or at right angles to the wave front. The non-uniform directional characteristic of such a loop is commonly called a "figure eight", which it resembles, as indicated graphically by the two circles B and B′ in Fig. 2.

The energy absorbed by and flowing in the loop is said to be due to phase difference between its sides; the momentary flow of energy absorbed by the antenna may be in the same or the opposite direction to that flowing in the side of the loop to which the antenna is connected, depending upon the direction of the transmitting station and the position of the loop.

When passing electromagnetic waves act on antenna 1 and the loop 3 a current is produced in each of them and these currents act simultaneously (for example by induction, as in the case illustrated) on the detector 11. The resultant action on the detector differs from that which would be produced by the antenna or the loop acting separately. If the action, on the detector, of the antenna and the loop are equal and in phase the maximum effect will be produced in the head-telephones 14; if the said actions are equal but opposite the minimum effect will be produced.

By connecting the absorbing loop directly in the antenna circuit I prevent any harmful distortion of their resultant directional characteristic such as may occur if the antenna alone were in the antenna circuit and the loop in the secondary circuit and the two inductively coupled by a variable-coupling transformer.

Secondary coil 6 of transformer 5 is shunted by a tuning condenser 7 and connected in any conventional manner to a detector of any type. In the case illustrated a detector of the vacuum tube or electron discharge type is shown, comprising an anode or plate electrode 8, grid 9, and filament 10, all inclosed in evacuated envelop 11. Energy for heating the filament and thus causing it to emit electrons is supplied by a battery or any other convenient source 12 through a regulating resistance 13. One terminal of head-telephone receivers or other suitable translating device 14 is connected to the plate electrode 8 and the other terminal to the positive side of battery 15, or its equivalent. A variable condenser 16 is shunted across the head-telephones and battery 15 for the purpose of by-passing radio frequency currents in the plate circuit. A grid condenser 17 is connected in series with the grid. The connections thus shown comprise one form of regenerative or oscillation generating circuit and may be used for the reception of damped or undamped waves. It will also be understood that any number of vacuum tubes may be added for the purpose of amplifying the received energy.

Fig. 2 illustrates at A, B, B′ and C the effects of the antenna and the loop and of the resultant effect on the detector. The resultant curve C is obtained by taking the effect on the detector of the uniform absorption of the antenna as equal and in phase with the effect on the detector of the loop illustrated by the circle B, and as equal and opposed in phase on the detector of the loop illustrated by the circle B′. The points from which curve C is plotted will consequently be obtained by adding to the uniform radii of A which traverse B the corresponding vector radii of B, and by subtracting from the uniform radii of A which traverse B′ the corresponding vector radii of B′.

It will be readily understood that the frequency constants of antenna 1 will to a certain extent limit the inductance of coil 3 for any given wave-length, and the energy absorbed by the antenna and the coil will be considerably limited if they are so proportioned that their absorption factors are substantially equal. In order to increase the size of the antenna and absorb greater energy, yet at the same time keeping the absorption due to the non-uniform absorption structure in proper proportion, a second coil 3ª has been added in the secondary circuit as shown in Fig. 3 which comprises a modification of Fig. 1. The two parallel loops or coils 3 and 3ª are wound on frames or other suitable means of support and sufficiently separated that their respective fields have little or no effect upon each other. The frames are secured to a bar 18 to which is attached a vertical shaft 19 rotatively mounted in bearings 20 and 21 of supporting base 22. The upper end of base 22 comprises a compass scale and by means of a pointer 23 secured to shaft 19 the angular bearings of intercepted stations may be readily determined.

The primary coil 4 and secondary coil 6 of transformer 5 are so arranged that they may be rotated relative to each other or separated any suitable distance to reduce the electromagnetic coupling between them which reduces the energy transferred from the primary to the secondary circuit and the detector. Such an arrangement is very useful especially when strong signals are being received in order that more accurate or closer directional reading may be obtained.

What I claim is:

1. Radio apparatus comprising an antenna path constituting substantially uniformly directive structure, a coil constituting non-uniformly directive structure, said coil connected in series with said antenna path, a second non-uniformly directive coil, and an oscillation circuit co-acting directly with said second coil and with said antenna path and only indirectly through said antenna path with said first named coil.

2. Radio receiving apparatus comprising an antenna path constituting substantially uniformly directive absorption structure, a coil constituting non-uniformly directive absorption structure, said coil connected in series with said antenna path, a second non-uniformly directive absorption coil, and a receiving circuit disposed in direct energy-transfer relation with said second coil and said antenna path and in indirect energy-transfer relation through said antenna path with said first named coil.

3. Radio apparatus comprising an antenna path constituting substantially uniformly directive structure, a non-uniformly directive coil in series in said antenna path, a second non-uniformly directive coil inductively independent of said first named coil, and a closed circuit including said second named coil disposed in energy transfer relation with said antenna path, said coils being rotatable in unison with each other.

4. Radio apparatus comprising an anantenna path constituting substantially uniformly directive structure, a non-uniformly directive coil in series in said antenna path, a second non-uniformly directive coil inductively independent of said first named coil, and a closed circuit including said second named coil disposed in energy transfer relation with said antenna path.

5. Radio apparatus comprising an antenna path constituting substantially uniformly directive structure, a non-uniformly directive coil in series in said antenna path, a closed oscillation circuit, rotatable means for coupling said circuit and said antenna path, and a second non-uniformly directive coil inductively independent of said first named coil connected in said closed circuit.

6. Radio apparatus comprising an antenna path constituting substantially uniformly directive structure, a non-uniformly directive coil in series in said antenna path, a closed oscillation circuit, rotatable means for coupling said circuit and said antenna path, and a second non-uniformly directive coil inductively independent of said first named coil connected in said closed circuit, said coils being rotatable in unison with said coupling means.

7. Radio apparatus comprising an antenna path constituting substantially uniformly directive structure, a non-uniformly directive coil in series in said antenna path, a closed oscillation circuit, rotatable means for coupling said circuit and said antenna path, and a second non-uniformly directive coil inductively independent of said first named coil and connected in said closed circuit, said coils being rotatable in unison with said coupling means and so positioned with respect to each other that their directions of maximum energy interchange with the natural media are parallel.

8. Radio apparatus comprising an open antenna path constituting a uniformly directive absorption structure and including in series a non-uniformly directive absorption structure, a receiver circuit operatively related to said antenna path, and non-uniformly directive absorption structure separately affecting said circuit independently of said first named non-uniformly directive absorption structure.

9. Radio apparatus comprising a closed oscillation circuit, and a plurality of non-uniformly directive absorption coils inductively independent of each other and separately co-operatively related with said circuit.

10. Radio apparatus comprising a closed oscillation circuit, and a plurality of non-uniformly directive absorption coils inductively independent of each other and separately co-operatively related with said circuit, and means for rotating said coils in unison.

11. Radio apparatus comprising a closed oscillation circuit, and a plurality of non-uniformly directive absorption coils inductively independent of each other and separately co-operatively related with said circuit, said coils being so positioned with respect to each other that their directions of maximum energy transfer between themselves and the natural media are parallel.

12. Radio apparatus comprising a closed oscillation circuit, and a plurality of non-uniformly directive absorption coils inductively independent of each other and separately co-operatively related with said circuit, and means for rotating said coils in unison, said coils being so positioned with respect to each other that their directions of maximum energy transfer between themselves and the natural media are parallel.

In testimony whereof I have hereunto affixed my signature this 31 day of January, 1923.

LLOYD M. KNOLL.